United States Patent
Schumacher

(12) 
(10) Patent No.: US 12,143,414 B2
(45) Date of Patent: Nov. 12, 2024

(54) PENETRATION TESTING IN ZERO TRUST NETWORK ENVIRONMENT

(71) Applicant: T-Mobile Innovations LLC, Overland Park, KS (US)

(72) Inventor: Greg Schumacher, Holliston, MA (US)

(73) Assignee: T-Mobile Innovations LLC, Overland Park, KS (US)

( * ) Notice: Subject to any disclaimer, the term of this patent is extended or adjusted under 35 U.S.C. 154(b) by 157 days.

(21) Appl. No.: 17/899,427

(22) Filed: Aug. 30, 2022

(65) Prior Publication Data

US 2024/0073236 A1 Feb. 29, 2024

(51) Int. Cl.
*H04L 9/40* (2022.01)

(52) U.S. Cl.
CPC ........ *H04L 63/1433* (2013.01); *H04L 63/083* (2013.01); *H04L 63/20* (2013.01)

(58) Field of Classification Search
CPC .......... H04L 43/06–065; H04L 63/083; H04L 63/14; H04L 63/1408; H04L 63/1425; H04L 63/1433; H04L 63/20
See application file for complete search history.

(56) References Cited

U.S. PATENT DOCUMENTS

| 10,798,059 | B1* | 10/2020 | Singh | H04L 63/029 |
| 2012/0255022 | A1* | 10/2012 | Ocepek | G06F 21/552 726/25 |
| 2020/0045073 | A1* | 2/2020 | Ekambaram | G06F 21/577 |

* cited by examiner

*Primary Examiner* — Kevin Bechtel

(57) ABSTRACT

A method comprises generating, by a test application in a test system of the zero trust network, a test packet comprising a unique token identifying the penetration test based on a test log, wherein the test log indicates that the penetration test is to be performed on a communication between a source microsegment and a target microsegment, transmitting, by the test application, the test packet to a policy enforcement point in the target microsegment, wherein a result log stores data, in association with the unique token, regarding at least one of a reception or processing of the test packet by the policy enforcement point, and comparing, by a log application in the test system, the test log and the result log to determine that the test packet has impermissibly passed through the policy enforcement point or been processed by the policy enforcement point.

20 Claims, 7 Drawing Sheets

PENETRATION TESTING IN ZERO TRUST NETWORK ENVIRONMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Business enterprises have increasingly used penetration testing and vulnerability scanning as a method of testing security tools and controls deployed at a network perimeter. The results of the penetration test measures and validates coverage of the security tools and controls. This in turn increases confidence in both detection and prevention of unauthorized access to the network and the digital resources in the network. The performing of the penetration test and any subsequent corrective action performed in response to the penetration test is largely a manual effort. For example, a penetration test may involve finding ways or paths for an unauthorized user to penetrate a target enterprise network, to potentially maliciously access and modify enterprise resources.

Penetration tests may be primarily performed at the perimeter of the enterprise network, for example, at the firewalls that operate to block communications entering the network that are deemed to be security threats. Today, many enterprises rely upon computing platforms located not inside the enterprise but rather located in a third-party cloud computing environment. Additionally, users are increasingly accessing enterprise networks from his or her home, rather than accessing the enterprise network from within a physical perimeter (e.g., on premise employees and desktop computers or laptop computers connected to a physical network inside the walls of buildings owned or leased by enterprises). In this context, the abstraction of a defensive perimeter is severely strained.

A new enterprise network security strategy called a zero trust network environment has come to the fore. In a zero trust network architecture, the enterprise network domain is partitioned into multiple microsegments. Computers or execution platforms within a microsegment are allowed to communicate with each other "in the clear" (e.g., these intra-microsegment communications are deemed trusted and communicate without encrypting their messages) but communications between microsegments are deemed untrusted and may be required to be conducted via secure tunnels that rely upon encrypted communications between endpoints to secure the communication.

SUMMARY

In an embodiment, a method for performing a penetration test in a zero trust network to identify vulnerabilities in the zero trust network is disclosed. The method comprises obtaining, by a test application in a test system of the zero trust network, parameters for performing the penetration test in the zero trust network. The parameters indicate a path from a source microsegment to a target microsegment in the zero trust network. In one case, the source microsegment may be an end user (e.g., customer or employee) performing standard work tasks that may access the target microsegment. In another case, the source microsegment may be impersonating one or more computer systems or microservices grouped into a microsegment. The communications between the source microsegment and the target microsegment are to be prohibited or blocked. The parameters and results are stored in a test log. The method further comprises inserting, by the test application, a unique token identifying the specific penetration test instance into a test packet to perform the penetration test between the source microsegment and the target microsegment, in which the test packet indicates that a source of the test packet is in the source microsegment. The method further comprises transmitting, by the test application, the test packet to a policy enforcement point in the target microsegment, in which a result log associated with the policy enforcement point stores data regarding at least one of a reception of the test packet by the policy enforcement point or a subsequent processing step performed by the policy enforcement point, and the data is stored in record log in association with the unique token. The method further comprises determining, by a log application in the test system, whether the test packet impermissibly passed through the policy enforcement point or has been impermissibly processed by the policy enforcement point based on the test log and the result log indicating whether the test packet comprising the unique token has impermissibly passed through the policy enforcement point or been processed by the policy enforcement point. This determination also allows a determination of whether the zero trust network detected and blocked the unauthorized request generated by the test application, which policy enforcement point the blocking occurred (or did not occur) in, and which policy decision point rule allowed or blocked test and why. The method further comprises transmitting, by a result application in the test system, to a policy decision point in the zero trust network, a message comprising a recommendation to prohibit a communication from the source microsegment to the target microsegment when the test packet comprising the unique token has impermissibly passed through the policy enforcement point or been processed by the policy enforcement point. In this way, the result application may provide recommendations regarding possible policy decision point rules (or other rule-base security functions) to enhance by communicating the common parameters of test packets (e.g., Transmission Control Protocol (TCP) ports and/or Hypertext Transfer Protocol (HTTP) header values) that impermissibly pass through or are processed by policy enforcement points.

In another embodiment, a method for performing a penetration test in a zero trust network to identify vulnerabilities in the zero trust network is disclosed. The method comprises identifying, by a test application in a test system of the zero trust network, a plurality of policy enforcement points across a plurality of different microsegments in the zero trust network, and determining, by the test application, a penetration test to be performed from a source microsegment to a target microsegment. The target microsegment comprises a first policy enforcement point and a second policy enforcement point of the plurality of policy enforcement points. The method further comprises recording, by the test application, in a database coupled to the test system, a test log indicating the source microsegment, the target microsegment, a path in the zero trust network by which to perform the penetration test to access a server in the target microsegment, and a unique token identifying the penetration test instance. The path passes through at least the first policy enforcement point and a second policy enforcement point before potentially reaching the server. The method further comprises transmitting, by the test application, a test packet through the first policy enforcement point to the second policy enforcement point along the path in the first microsegment, in which the test packet comprises the unique token and indicates that a source of the test is in a source microsegment. A result log associated with the policy enforcement point stores data regarding at least one of a reception of the test packet by a policy enforcement point or a subsequent processing step performed on the test packet by the policy enforcement point, and the data is stored in the record log in association with the unique token. The method further comprises transmitting, by a result application in the test system, to a policy decision point in the zero trust network, a message comprising a recommendation to prohibit a communication from the source microsegment to the target microsegment.

In yet another embodiment, a method for performing a penetration test in a zero trust network to identify vulnerabilities in the zero trust network is disclosed. The method comprises generating, by a test application in a test system of the zero trust network, a test packet comprising a unique token identifying the penetration test based on a test log, in which the test packet indicates that a source of the test packet is in the source microsegment. The test log indicates that the penetration test is to be performed on a communication between a source microsegment and a target microsegment. Communications between the source microsegment and the target microsegment are to be prohibited. The method further comprises transmitting, by the test application, the test packet to a policy enforcement point in the target microsegment. A result log associated with the policy enforcement point stores data regarding at least one of a reception of the test packet by the policy enforcement point or a subsequent processing step performed by the policy enforcement point, and the data is stored in the result log in association with the unique token. The method further comprises comparing, by a log application in the test system, the test log and the result log to determine that the test packet has impermissibly passed through the policy enforcement point or been processed by the policy enforcement point based on a test log entry in the test log comprising the unique token and a result log entry in the result log comprising the unique token, in which the test log entry and the result log entry are both associated with the policy enforcement point. The method further comprises transmitting, by a result application in the test system, to a policy decision point in the zero trust network, a message comprising a recommendation for the policy enforcement point in the target microsegment to prohibit reception and processing of communications from the source microsegment.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
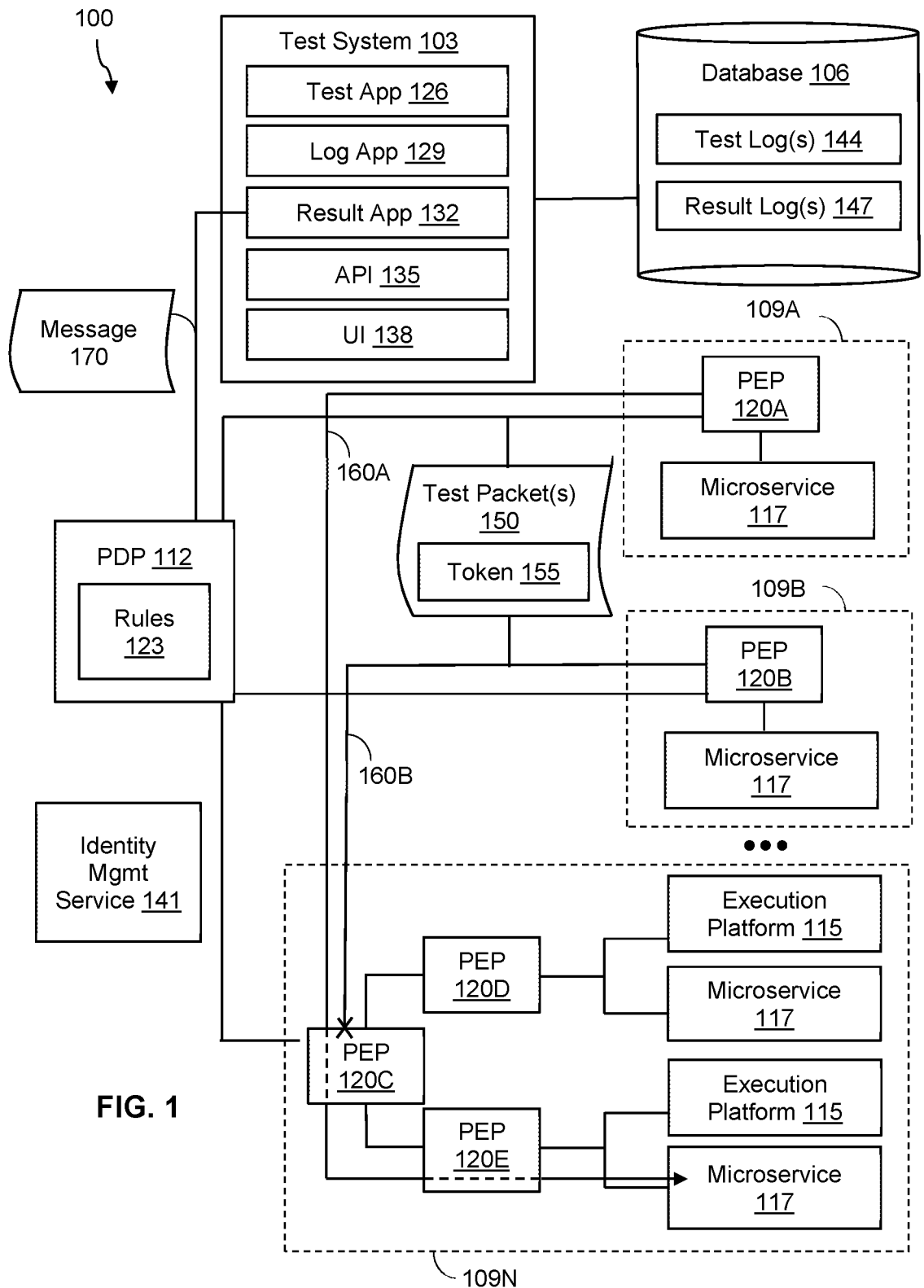
FIG. 1 is a block diagram of a network according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, a penetration test may involve finding ways or paths for an unauthorized user or attacker to penetrate a target enterprise network at the perimeter, to potentially maliciously access and modify enterprise resources. In particular, a penetration test may involve a test user assuming the role of an attacker external to the enterprise network attempting to enter the network. The test user may be anybody dealing with security in the enterprise. Since enterprise networks primarily implement external security controls at the network perimeter, the perimeter penetration testing usually involves a single authentication and authorization check. If the authentication and authorization check has passed, the user may be able to impermissibly access any resource on the internal enterprise network, unless application level security controls are in place. In this case, the test user may manually determine a corrective action for the impermissible penetration that passed through the network. For example, the corrective action may involve implementing additional perimeter security functions or enhancing existing security controls at the perimeter.

However, penetration testing and vulnerability scanning becomes far more problematic and complicated in a zero trust network because of the multiple microsegments of the enterprise network that are located in disparate locations including cloud deployments. Communication between devices in different microsegments, systems, or micro-services of a zero trust network may occur over secure tunnels that are based on encrypted communications and that is mediated, in part, by policy enforcement points (PEPs). In an enterprise network that is implemented as a zero trust network, penetration testing may not simply be performed at the perimeter of the network, but instead may be performed across and within the multiple microsegments, and even within and external to the enterprise network. In addition, zero trust networks grant access to different classes of users in different manners according to different rules, and each of these different classes of users may need to be tested separately in a zero trust network. Thus, this is a technical problem rooted in the technology of the newly developed zero trust architecture. The disclosure and claims will use the umbrella term microsegment hereafter to refer to a microsegment, a system, or a micro-service that is linked by a PEP to the rest of the zero trust network.

The present disclosure teaches a particular technical solution to this technical problem. The system of the present disclosure provides a test system in the enterprise network. The test system may interact with different microsegments and a policy decision point (PDP) in the network, to perform penetration testing across the different microsegments and perform corrective actions at the PDP when necessary. As further described below, the embodiments disclosed herein perform penetration testing in a zero trust network architecture in a more efficient manner analyzing a test log identifying parameters of the penetration test with result logs indicating activities performed by various security elements (e.g., PEP, firewall, etc.) in the target microsegments based on a unique token identifying the penetration test carried in the testing communications. These security elements may be between the test system and the target microsegment on a communication or networking path in the system. The unique token in conjunction with the test log and the result log(s) are used to perform penetration testing in a zero trust network in an automated fashion. The unique token may be an alphanumeric string. The unique token may be a binary number, such as a string of bit values. In an embodiment, the unique token may be quasi-unique, in the sense that a same token value may be periodically reused. For example, a 16-bit number may be used to provide a quasi-unique token, and after about 65,536 penetration tests, the quasi-unique token values may begin to be recycled. For example, an 8-bit number may be used to provide a quasi-unique token, and after about 256 penetration tests, the quasi-unique token values may begin to be recycled. It will be appreciated that a tester would be able to distinguish between test runs with such quasi-unique tokens nearly as easily as if formally unique token values were used. In an embodiment, the unique token and/or quasi-unique token may embed a date of the penetration test. In an embodiment, the unique and/or quasi-unique token may embed a date and a time of the launch of the penetration test. For example, the unique and/or quasi-unique token may embed a date and/or a date and a time the penetration test was launched and additionally a sequence number. As used herein, the term unique token can mean either a formally unique token value or a quasi-unique token value, as described above.

In an embodiment, the test system assumes the role of an unauthorized device attempting to communicate with a target microsegment and generates test packets that are to be sent to a target microsegment, which should be rejected or dropped by the PEPs in the network path to the target microsegment. For example, a test application in the test system generates a test packet having a source identifier identifying a source of the test packet, which may be an end user (e.g., customer or employee) performing standard work tasks that may access the target microsegment, or a source microsegment impersonating one or more computer systems or microservices grouped into a microsegment, either of which is not permitted to communicate with the target microsegment. The test application may insert a unique token identifying the penetration test into the test packets transmitted into the target microsegment to perform the penetration test. The unique token may be any value or identifier uniquely identifying the instance of the penetration test currently being performed using the test application.

In an embodiment, the test application may record in a test log indicating the unique token and various parameters describing the penetration test. For example, the parameters may include a path to and through the target microsegment to reach a destination, a source identifier of the source of the test packet, a destination identifier and/or an identification of the target microsegment, etc. The path may be indicated using identifiers of various nodes or links along the path to and through the target microsegment. The embodiments disclosed herein may be used on various types of penetration tests, including black box, white box, and gray box penetration tests. In some cases, the parameters included in the test log may be based on whether the penetration is a black box, white box, or gray box test, and based on the amount of information and network visibility provided to the test system. The test packets may constitute the packets used to perform the penetration test, which may be any time of penetration test, such as, for example, a network penetration test, a web application penetration test, a client side penetration test, a wireless penetration test, a social engineering penetration test, etc.

The test application may transmit the test packets to a security element in the target microsegment. For example, the security element may be a PEP, a firewall, or any other type of security tool or control used in the target microsegment. The security element performs the standard function of determining whether the test packet is permitted to pass through the security element or whether further processing is to be performed based on the test packet.

In an embodiment, the security element records, in an entry in a result log, whether the test packet is permitted to pass through the security element or whether further processing is to be performed based on the test packet. The entry may include the unique token carried in the test packet. A log application, authorized to receive the result log from the target microsegment, may retrieve the result log from one or more security elements in the target microsegment. The log application may determine entries in the test log that include the unique token and entries in the result log that include the unique token. The entries in the result log that include the unique token and correspond to the entries in the test log that include the unique token may indicate results of the penetration test.

A result application in the test system may use the entries in the result log that correspond to the results of the penetration test to determine which security elements in the target microsegment that impermissibly allowed the test packets to pass through to the target microsegment or that properly enforced security mechanisms on the test packets. The result application may also use the entries in the result log to determine the exact position in the network that the security element failed to enforce security mechanisms on the test packets and a possible reason that the security element failed to enforce the security mechanisms. For example, when the security element is a firewall, the firewall may not have been configured to block packets having the source identifier. In this example, the result application may determine the lack of configuration at the firewall based on the entries in the result log associated with that particular firewall. As another example, when the security element is a PEP, the PEP may not have been instructed by the PDP to prevent the target microsegment from communicating with the source microsegment, or the PDP may not include a rule indicating that the target microsegment is prohibited from communicating with the source microsegment. In this example, the result application may determine the lack of instructions at the PEP or the lack of the rule at the PDP based on the entries in the result log associated with that particular PEP.

The result application may initiate corrective actions after determining the security elements in the microsegment that failed to enforce security mechanisms on the test packets. For example, in the foregoing firewall example, the result application may automatically send a message to the firewall including parameters of the penetration test or test packet the resulted in the failure (e.g., TCP socket information, HTTP header information, etc.). The result application may send an instruction to the firewall to configure the firewall at the target microsegment to block packets having the source identifier. In the foregoing PEP example, the result application may automatically send a message to the PDP including the parameters of the penetration test or test packet the resulted in the failure. In this case, the PDP may then use this message to instruct the PEP to prevent a secure tunnel from being established between the source microsegment and the target microsegment, to thus prevent communications between the source microsegment and target microsegment.

In an embodiment, the test system may perform the penetration tests targeting multiple microsegments in an enterprise network in a parallel fashion, progressively, such that each penetration test continues to penetrate the target microsegment until a test packet is blocked or rejected by a security element. For example, the test system may perform a first penetration test at a first microsegment using a first test packet having a first unique token, and simultaneously perform a second penetration test at a second microsegment using a second test packet having a second unique token. Suppose that the first test packet is blocked by a first PEP in the first microsegment, but the second test packet passes through the first PEP in the second microsegment when it should not. In this case, the second test packet may be forwarded to a next PEP/security element in the second microsegment, a next PEP/security element, and so on, along a path indicated in the test log for the second penetration test, until the second test packet reaches a target destination at the second microsegment. At this stage, the log application and the result application may correlate the test logs and result logs across the security elements in first microsegment and second microsegment to analyze the security enforcement across the microsegments and make corrective recommendations as necessary, in the manner described above.

In this way, the embodiments disclosed herein enable penetration testing to be performed across and within microsegments of the enterprise network, as opposed to simply at the perimeter of the entire enterprise network. This is enabled by the use of the unique token with the test log and the result log, which have not been used together before for the purpose of penetration testing. Therefore, the embodiments disclosed provide a fine-grained and more accurate approach to penetration testing in a zero trust network, which thus leads to more secure data transmissions in a network, with less failures and security attacks. In addition, zero trust networks typically include significantly more log data to analyze, due to the distributed architecture of the zero trust network. Therefore, the embodiments disclosed herein serve to automate and reduce the effort required in parsing through the massive amounts of log data and identifying failures in the network indicated in the log data. This in turn leads to a far more efficiently operating zero trust network that maintains high security resources that need proper protection.

Turning now to FIG. 1, an enterprise network 100 is described. In an embodiment, the network 100 implements a zero trust communication network architecture. The network 100 comprises a test system 103, a database 106, multiple microsegments 109A-N, and a PDP 112. While FIG. 1 only shows three microsegments 109A, 109B, and 109N, it should be appreciated that network 100 may comprise any number of microsegments.

The microsegments 109A-N, also referred to as microdomains, may each comprise one or more execution platforms 115 executing one or more applications or one or more microservices 117. An execution platform 115 may be implemented as one or more computers and may comprise a computer system, server, one or more devices, user equipment (UE), etc. Computer systems are described further hereinafter with reference to FIG. 6. A microservice 117 may be a software application or bundle that executes on one or more computer systems.

Communication access between the microsegments 109A-N may be mediated by PEPs 120A-E, also referred herein as security elements. In particular, communication access to the microsegment 109A may be mediated by a first PEP 120A, and communication access to the microsegment 109B may be mediated by a second PEP 120B. As shown in FIG. 1, microsegment 109N includes three PEPs 120C-E, in which communication access to the execution platforms 115 and microservices 117 within microsegment 109N is divided across PEPs 120C-E. In particular, PEP 120C may be responsible for filtering and/or separating communication access to the execution platforms 115 and microservices 117 through the PEP 120D and PEP 120E. PEP 120D may be responsible for filtering communication access to a first execution platform 115 and a first microservice 117, and the PEP 120E may be responsible for filtering communication access to a second execution platform 115 and a second microservice 117.

While FIG. 1 only depicts each microsegment 109A-N as including one or three PEPs 120A-E, it should be appreciated that each microsegment 109A-N may include any number of PEPs 120A-E. Similarly, it should be appreciated that microsegments 109A-N may include any number of execution platforms 115, microservices 117, and/or other virtual or hardware devices/services not otherwise shown in FIG. 1.

The network 100 also comprises the PDP 112, from which the PEPs 120A-E in each of the microsegments 109A-N request authorization decisions, which are used to determine whether to grant security access to certain test packets 150, as further described herein. In an embodiment, the PDP 112 is an application that executes on a computer system within the network 100. The PDP 112 may be configured with rules 123, which may be policies or criteria for authorizing secure tunnels and inter-microsegment 109A-N communications. The rules 123 may define fine-grained authorized access controls that the PDP 116 can apply in granting, restricting, or denying access to microsegments 109A-N.

The network 100 also comprises the test system 103, which executes a test application 126, a log application 129, and a result application 132, the operations of which are further described herein. As should be appreciated, the test system 103 may include other applications not otherwise shown in FIG. 1.

The test system 103 may be communicatively coupled to the database 106, which may be a server or a cloud-based data center with memory storing a test log 144 and a result log 147. A test log 144 may comprise parameters related to one or more penetration tests performed in the network 100. For example, the parameters may comprise data included in the test packets 150 for the respective penetration test (e.g., a source identifier, target identifier, etc.), a timestamp of sending each of the test packets 150, identifiers of elements (e.g., nodes, links, virtual functions (VFs), network functions (NFs), firewalls, PEPs, etc.) along a path by which to perform the penetration test, etc. In an embodiment, the parameters may include a unique token 153, which may be a value identifying the respective penetration test instance. In an embodiment, different unique tokens 153 may be used to identify different penetration test instances performed on the network 100. The result log 147 may be obtained from one or more secure elements, or PEPs 120A-E, in the network 100. The result log 147 comprises a log of activity recorded by each of the PEPs 120A-E, for example, within a timeframe. For example, the result log 147 may include data included in the packets received by the PEP 120A-E (e.g., the unique token 153, source identifier, etc.), timestamps of receiving the packets, an indication of whether the packet passed through the PEP 120A-E for further processing/transmission or was blocked by the PEP 120A-E, a description of the processing for blocking the packet when the packet was blocked by the PEP 120A-E, a description indicating the processing performed on the packet when the packet was not blocked by the PEP 120A-E, an identification of a next node along which the packet was forwarded when the packet was not blocked by the PEP 120A-E, etc.

The test system 102 may also include one or more application programming interfaces (APIs) 135, which are interfaces by which the test system may communicate with the other applications, devices, or systems in the network 100. The test system 103 may also include a user interface (UI) 138, by which a user of the test system 103 may provide credentials such as a user name and a password to an identity management service 141, which authenticates the test system 103. The user, if authenticated, may launch the test application 126, log application 129, and/or a result application 132 to perform the penetration testing, vulnerability scanning, and corrective actions in an authorized manner as disclosed herein. In some embodiments, the user may provide different credentials to perform the penetration under the guise of different types or classes of users with different microsegment access privileges, as further described below.

If authenticated, the user may retrieve security credentials associated with the user from a memory inside the test system 103. The test system 103 may use the user security credentials and the test system security credentials to authenticate with the identity management service 141. Upon authentication with the identity management service 141, the test system 103 may assume the role of a device within any of the microsegments 109A-N, and/or assume the role of a particular class of a user having certain microsegment access privileges, to perform penetration testing, vulnerability scanning, and corrective actions on one or more target microsegments 109A-N in the network 100.

The user of the test system 103 may determine one or more penetration tests to perform on the microsegments 109A-N in the network 100 and execute the test application 126 to record the parameters of each of the penetration tests in the test logs 144. In an embodiment, the test system 103 may assume the role of an authorized device from an unauthorized microsegment 109A-N to perform a penetration test on a target microsegment 109A-N in the network 100. The test application 120 may generate one or more test packets 150 to be sent to a target microsegment 109A-N, to test whether the target microsegment 109A-N properly rejects the test packets 150.

FIG. 1 shows an example in which two penetration tests 160A-B are performed simultaneously by the test system 103: a first penetration test 160A from microsegment 109A to microsegment 109N, and a second penetration test 160B from microsegment 109B to microsegment 109N. In the first penetration test 160A, the test application 126 may assume the role of a device within microsegment 109A, which communicates through PEP 120A. The test log 144 for the first penetration test 160A may include parameters indicating that the test is to be performed to attempt to establish a secure tunnel between PEP 120A in microsegment 109A and PEP 120C in the microsegment 109N, to ultimately reach the destination of the first execution platform 115 behind PEP 120D in the microsegment 109N. The test application 126 may generate test packets 150 based on the parameters to attempt to establish the secure tunnel between PEP 120A in microsegment 109A and PEP 120C in the microsegment 109N. Since the penetration test 160A is executed with the expected goal of being blocked, the establishment of the secure tunnel between PEP 120A and PEP 120C should be prohibited in the network 100, based on rules 123 that may have been instructed by the PDP 112 to both PEP 120A and 120C.

In an embodiment, the test application 126 may insert, into the test packet 150, the unique token 155 identifying the first penetration test 160A recorded in the test log 144 of the first penetration test 160A. As should be appreciated, the test packets 150 may be encoded using any type of data transmission protocol, such as, for example, Internet Protocol (IP), Transmission Control Protocol (TCP), TCP/IP, User Datagram Protocol (UDP), Hypertext Transfer Protocol (HTTP), HTTP Secure (HTTPS), Internet Control Message Protocol (ICMP), Session Initial Protocol (SIP), or any other type of data transmission protocol not otherwise listed herein. In an embodiment, the unique token 155 may be carried in an empty or reserved field of the test packet 150, which may be encoded according to an existing data transmission protocol, such as, for example, one of the foregoing listed data transmission protocols. In another embodiment, the test packet 150 may be encoded according to a new data transmission protocol, with a field dedicated to carrying the unique token 155 to perform the penetration test 160A.

The test application 126 may also insert, into the test packet 150, a source identifier of the device in the microsegment 109A to the test packet 150. For example, the source identifier may be carried in the source identifier field of the test packet 150. In an embodiment, the test application 126 may also indicate in the test packet 150 that the test packet 150 is used to perform the first penetration test 160A between microsegment 109A and microsegment 109N. In this example, the test packet 150 may be a packet to initiate setup of a secure tunnel between PEP 120A and PEP 120C. Once the test packet 160A is generated, the test application 126 may transmit the test packet 150 directly to PEP 120C in microsegment 109N, or transmit the test packet 150 to PEP 120A in microsegment in 109A with instructions to transmit the test packet 150 to PEP 120C in microsegment 109N.

Once PEP 120C receives the test packet 150, the PEP 120C may begin processing the test packet 150 in a standard manner based on configurations programmed at the PEP 120C. Since the test packet 150 may be one of the initial packets used to request setting up a secure tunnel between PEP 120A and PEP 120C, the PEP 120C may first request authorization from the PDP 112 to set up a secure tunnel with a PEP 120A in microsegment 109C. In this example, the PDP 112 may not include a rule prohibiting the establishment of the secure tunnel with microsegment 109C. The PDP 112 may provide authorization to PEP 120C to set up the secure tunnel with PEP 120A, and thus, may permit the test packet 150 to access microsegment 109N. When the test packet 150 includes a request to read or write data at the first execution platform, the PEP 120C may permit the test packet 150 to pass through and forward the test packet 150 to PEP 120D. The PEP 120D may similarly continue processing and pass through microsegment 109N to ultimately impermissibly access resources at the first execution platform 115.

For the foregoing reasons, the first penetration test 160A may be regarded as a failed penetration test, and recorded as such in the result logs 147 of the various security elements, such as PEP 120C and PEP 120D, along the path of the first penetration test 160B. In an embodiment, the PEP 120C may record in a first entry in a result log 147 associated with the PEP 120C, in which the first entry may indicate that the test packet 150 is received and may indicate contents within the test packet 150 (e.g., the unique token 155, the source identifier, the destination identifier, etc.). The PEP 120C may also record a second entry in the result log 147 indicating that the test packet 150 has been processed and forwarded to PEP 120D along the path to the first execution platform 115. The PEP 120C may include the unique token 155 carried in the test packet 150 in the first entry and the second entry in the result log 147.

The PEP 120D may similarly record in a first entry in a result log 147 associated with the PEP 120D, in which the first entry may indicate that the test packet 150 is received from PEP 120C and may indicate contents within the test packet 150 (e.g., the unique token 155, the source identifier, the destination identifier, etc.). The PEP 120D may also record a second entry in the result log 147 indicating that the test packet 150 has been processed and forwarded to the first execution platform 115. The PEP 120D may indicate the unique token 155 from the test packet 150 in the first entry and the second entry in the result log 147.

In an embodiment, the PEP 120C and 120D may be triggered to transmit all updates to the respective result logs 147 to the database 106, such that the database 106 maintains the most up-to-date version of the result logs 147 corresponding to various elements in the network 100. In another embodiment, the log application 129 may be, for example, an application that is authorized to retrieve the result logs 147 from the elements in the network 100. In this embodiment, the log application 129 may request the result logs 147 from PEP 120C and 120D based on the test log 144 indicating that the first penetration test 160, if successful, may pass through a path including PEP 120C and PEP 120D.

In an embodiment, the log application 129 may then obtain the test log 144 for the first penetration test 160A and the result logs 147 from the elements on the path indicated in the test log 144 (e.g., PEP 120C and 120D). The log application 129 may then determine the unique token 155 of the first penetration test 160A from the test log 144, and then search the result logs 147 from the PEPs 120C and 120D to identify all entries that also indicate the unique token 155. The result log 147 for each element in the network 100 may include entries recording various activities performed by the element. In this way, the PEPs 120A-E may record entries in the result log 147 for all the traffic received by the PEPs 120A-E or for certain classes of traffic received by the PEPs 120A-E. Therefore, the log application 129 may filter through the entries in the result log 147 to identify only the entries that correspond to the first penetration test 160A using the unique token 155.

Once the entries that correspond to the first penetration test 160A are identified, the log application 129 may use the entries from the result logs 147 to determine that PEP 120C and PEP 120D impermissibly allowed the test packet 150, received from microsegment 109A, to pass through the microsegment 109C and have access to resources in the first execution platform 115. Based on the determination that the first penetration test 160A has failed, the result application 132 may be triggered to initiate a remediation or a corrective action automatically to account for the failed first penetration test 160A. In an embodiment, the result application 132 may generate a message 170 indicating parameters of the first penetration test 160A (and possibly other penetration test instances) that resulted in the failure of the first penetration test 160A. For example, the parameters may indicate the fields in the test packet 150, TCP ports or sockets by which the test packet 150 passed, HTTP header values of the test packet 150, etc. In an embodiment, the message 170 may comprise a recommendation for the PEP 120A and/or PEP 120C to prevent microsegment 109A from accessing resources at microsegment 109N. For example, the message 170 may comprise a recommendation for prohibiting the creation of a secure tunnel between microsegment 109A and 109N, which prohibits devices from microsegment 109A from accessing resources in microsegment 109N. In this way, the message 170 may be sent to the PEP 120A, PEP 120C, and/or the PDP 112. In an embodiment, PEP 120A and/or PEP 120C may program itself based on the message 170, to prohibit the creation of a secure tunnel between microsegment 109A and 109N and to prohibit devices from microsegment 109A from accessing resources in microsegment 109N.

Subsequently, the test system 103 may run another instance of the penetration test 160A to verify that the corrective action initiated by the result application 132 has been successfully implemented at the microsegment 109A and 109N. The next instance of the penetration 160A may be executed similar to that described above, except a different unique token 155 may be used in the test packets 150 to distinguish between the original failed first penetration test 160A and the subsequent re-test of the first penetration test 160A.

In some cases, the PEPs 120A-E may be programmed to permit access to different classes of users in different manners to provide different levels of security to the different classes of users. In this way, the user of the test system 103 may perform penetration testing and vulnerability testing with different user accounts for the different classes of users. Each user account may have been set up with specific zero trust authorization attributes and attribute values, such that the user account may only be allowed to access a subset of the enterprise resources in specific ways (e.g., read but not write, write but not read, etc.).

For example, the foregoing first penetration test 160A may be performed with an account authorized as a software developer account using the identity management service 141. The software developer account may be used to read financial resources, human resources, or accounting resources stored at microsegment 109N, but not write to these resources, according to one more rules 123. Supposing the test system 103 is assuming the role of the software developer account, and is guised as being on a device implemented in microsegment 109A, the test application 126 may send test packets 150 to microsegment 109N in which the source identifier identifies the device implemented in microsegment 109A. In this case, PEP 120C may be directed by the PDP to grant access to the test packets under a first layer of security being that the software developer account is permitted access to the resources stored at microsegment 109N. However, when a test packet 150 indicating a write request is received at PEP 120D, the PEP 120D may be directed by the PDP to reject the test packet 150 to disallow write access to the software developer account. The PEP 120C and PEP 120D may log all these actions in the respective result logs 147, and the log application 129 may recommend a more efficient security control mechanism to reject such a write access request based on commonalities from the penetration test results Next with regard to the second penetration test 160B, the test application 126 may generate test packets 150 based on a test log 144 of the second penetration test 160B. The test application 126 may insert, for example, a unique token 155 identifying the second penetration test 160B into each of the test packets 150. The test application 126 may also insert a source identifier of a device in microsegment 109B into each of the test packets 150. Once the test packet 160B is generated, the test application 126 may transmit the test packet 150 directly to PEP 120C in microsegment 109N, or transmit the test packet 150 to PEP 120B in microsegment 109N with instructions to transmit the test packet 150 to PEP 120C in microsegment 109N.

Once PEP 120C receives the test packet 150, the PEP 120C may begin processing the test packet 150 in a standard manner based on configurations programmed at the PEP 120C, for example, by the PDP 112. In the example shown in FIG. 1, PEP 120C may be directed to prevent devices from microsegment 120B from accessing resources in microsegment 109N based on instructions received from PDP 112. In this case, PEP 120C may reject or block the test packet 150 and record the rejection of the test packet 150, with the unique token 155, in the result log 147 associated with PEP 120C.

The log application 129 may obtain the result log 147 of the PEP 120C and correlate the result log 147 with the test log 144 of the second penetration test 160B using the unique token 155, in a manner similar to that described above, to determine how the PEP 120C handled the second penetration test 160B. The log application 129 may determine, from one or more entries in the result log 147 including the unique token 155, that PEP 120C successfully rejected the test packet 150 using programming at the PEP 120C, which was based on instructions received from the PDP 112. In this way, the result log 147 also indicates details regarding the successful penetration tests 160B performed in the network 100.

In some embodiments, the PEPs 120A-E in network 100 may be implemented as other types of security elements, such as, for example, a firewall. The other types of security elements may be configured to operate similar to the PEPs 120A-E to perform the enhanced penetration testing mechanisms described herein. For example, the other types of security elements may perform correlations between the test log 144 and the result log 147 using the unique token 155 to identify unexpected variances from natural language authentication policies to grant resource access. In the case that the security elements are zero trust elements (e.g., PEPs 120A-E), the test log 144 and/or the result log 147 may log the zero trust elements involved, including attributes, attribute values, decision rules, etc.

In this way, the embodiments disclosed herein may be used to identify vulnerabilities and loopholes in the microsegments 109A-N and then take corrective active to remediate the vulnerabilities and loopholes in the microsegments 109A-N (i.e., close the holes in the network 100 by which unauthorized users may access the microsegments 109A-N). Similarly, the embodiments disclosed herein may also be used by the test system 103 to learn and record security controls that have been properly implemented throughout the network 100.

Figure 2:
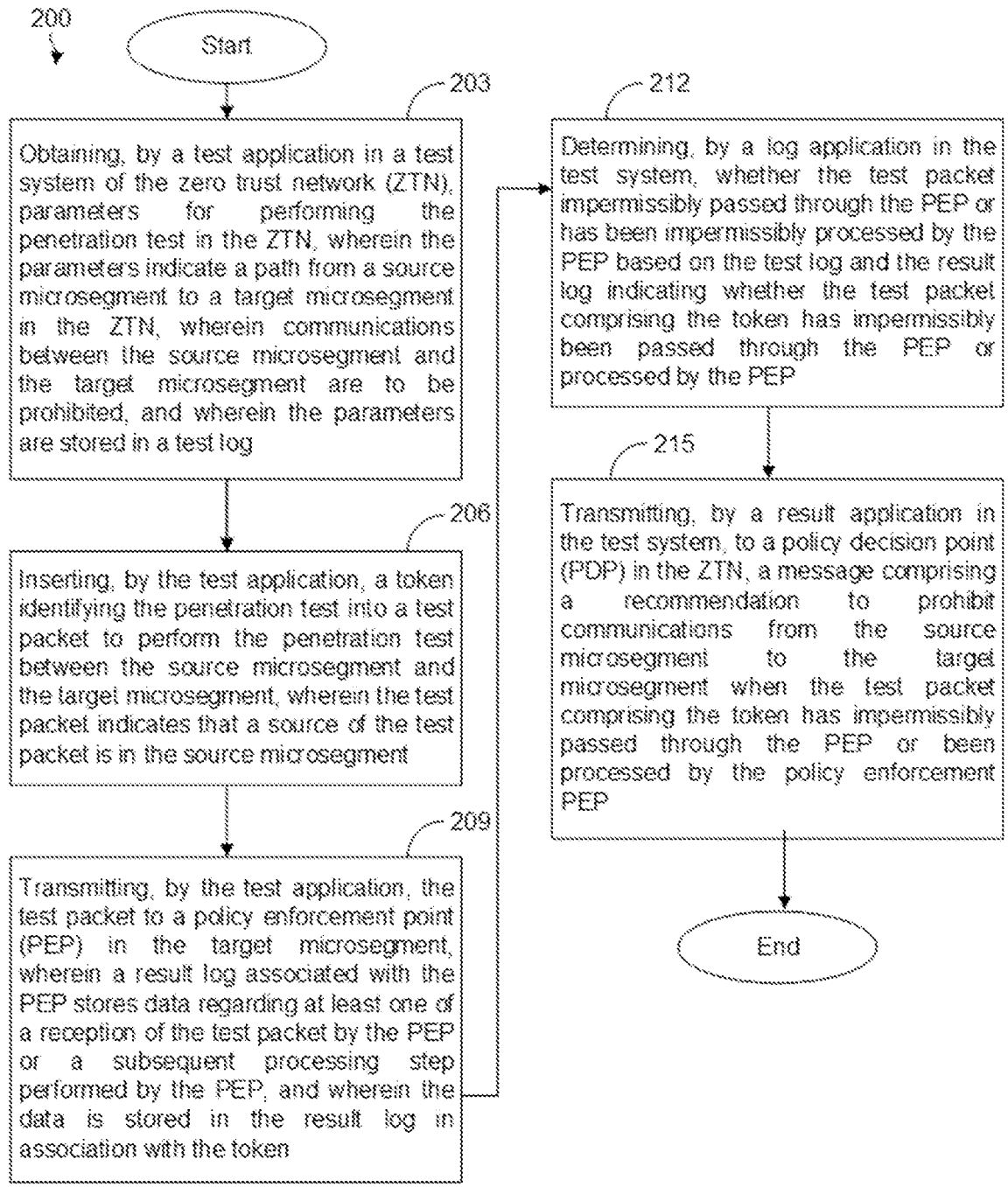
FIG. 2 is a flowchart of a first method according to an embodiment of the disclosure.

Turning now to FIG. 2, a method 200 is described. Method 200 may be implemented by the test system 103 in the network 100. In an embodiment, method 200 may be implemented when a user of the test system 103 determines a penetration test 160A-B (hereinafter referred to penetration test 160) to be performed on a target microsegment 109A-N (hereinafter referred to microsegment 109) in the network 100. In an embodiment, the network 100 is implemented as a zero trust network.

At block 203, method 200 may comprise obtaining, by a test application 126 in a test system 103, parameters for performing the penetration test 160 in the network 100. In an embodiment, the parameters indicate a path from a source microsegment 109 to a target microsegment 109 in the network 100. In an embodiment, the penetration test 160 is performed on the basis that communications between the source microsegment 109 and the target microsegment 109 are to be prohibited, for example, by security specifications, the rules 123, and/or the PDP 112 being expected to prohibit the test communication attempt in the penetration test 160. In an embodiment, the parameters are stored in a test log 144, which may be stored in a database 106 coupled to the test system 103.

At block 206, method 200 may comprise inserting, by the test application 126, a unique token 155 identifying the penetration test 160 into a test packet 150 to perform the penetration test 160 between the source microsegment 109 and the target microsegment 109. In an embodiment, the test packet 150 indicates that a source of the test packet 150 is in the source microsegment 109.

At block 209, method 200 may comprise transmitting, by the test application 126, the test packet 150 to a PEP 120A-E (hereinafter referred to PEP 120) in the target microsegment 109. In an embodiment, a result log 147 associated with the PEP 120 stores data regarding at least one of a reception of the test packet 150 by the PEP 120 or a subsequent processing step performed by the PEP 120. In an embodiment, the data is stored in the result log 147 in association with the unique token 155.

At block 212, method 200 may comprise determining, by a log application 129 in the test system 103, whether the test packet 150 impermissibly passed through the PEP 120 or has been impermissibly processed by the PEP 120. This determination may be performed based on the test log 144 and the result log 147 indicating whether the test packet 150 comprising the unique token has impermissibly passed through the PEP 120 or been processed by the PEP 120.

At block 215, method 200 may comprise transmitting, by a result application 132 in the test system 103, to a PDP 112 in the network 100, a message 170 comprising a recommendation to prohibit a communication from the source microsegment 109 to the target microsegment 109. The message 170 may also comprise parameters describing the penetration test 160 and/or the test packet 150. In an embodiment, the message 170 is transmitted when or in response to the test packet 150 comprising the unique token 155 impermissibly passing through the PEP 120 or been processed by the PEP 120. In an embodiment, the PDP 112 may determine rules based on the recommendation and parameters in the message 170.

Method 200 may comprise other steps and/or other attributes not shown in FIG. 2. In an embodiment, method 200 may further comprise receiving, by the log application 129, the result log 147 from the PEP 120, in which the log application 129 is authorized to receive the result log 147 from PEPs 120 in the network 100. In an embodiment, the unique token 155 is a value identifying the penetration test 160, wherein different unique tokens 155 identify different penetration tests 160 having different parameters. In an embodiment, the test packet 155 is encoded according to a data transmission protocol, in which the unique token 155 is carried in a field of the test packet 150. In an embodiment, the test log 144 comprises the parameters of the penetration test 160 in association with the unique token 155 identifying the penetration test 160. In an embodiment, the result log 147 comprises the unique token 155 and an indication that the test packet 150 of the penetration test 160 impermissibly passed through the PEP 120, resulting in a failure of the penetration test 160. In an embodiment, the result log 147 comprises a second unique token 155 identifying a second penetration test 160 and an indication that the second penetration test 150 was blocked at the PEP 120, resulting in a success of the penetration test 160.

Figure 3:
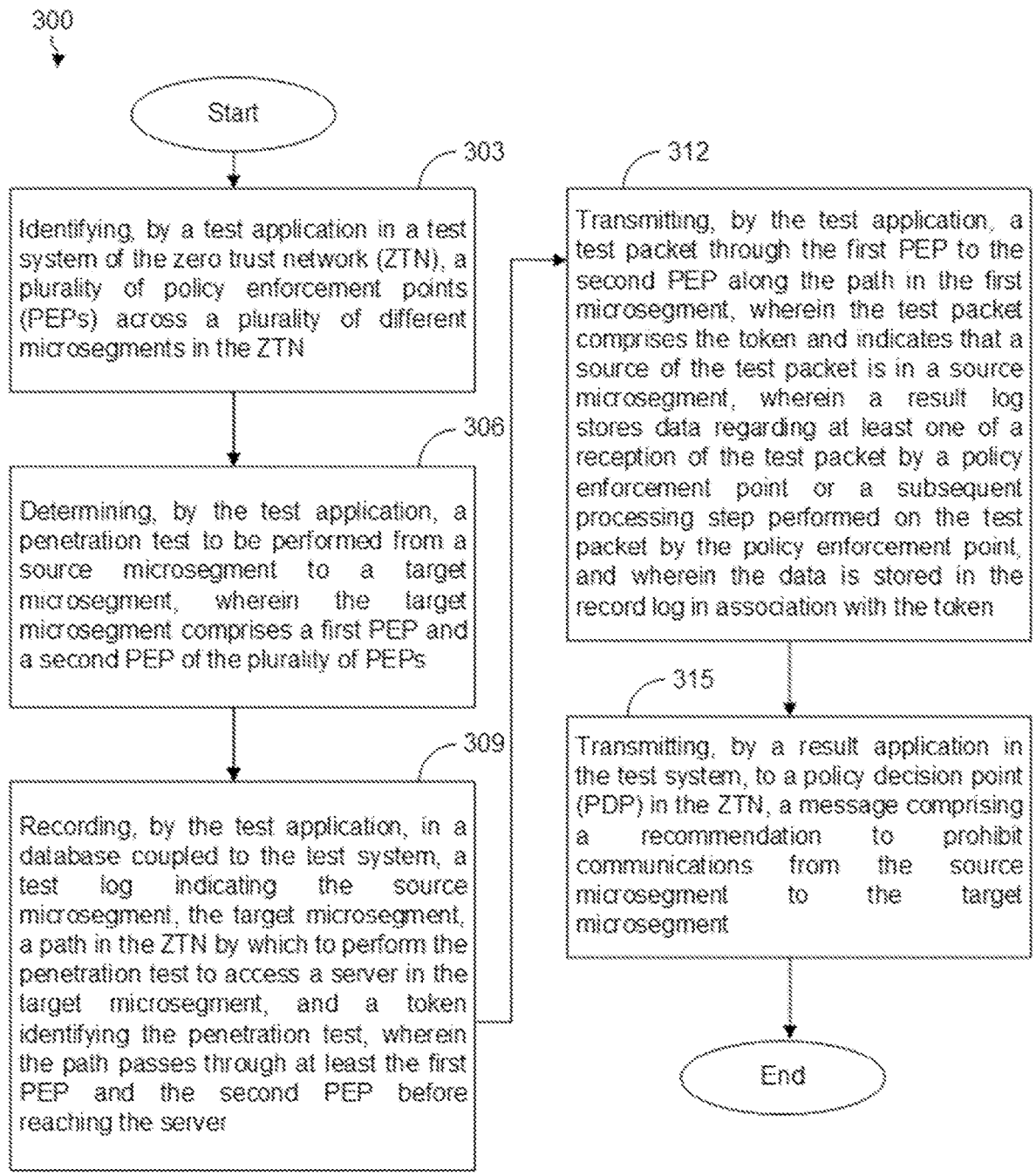
FIG. 3 is a flowchart of a second method according to an embodiment of the disclosure.

Turning now to FIG. 3, a method 300 is described. Method 300 may be implemented by the test system 103 in the network 100. In an embodiment, method 300 may be implemented when a user of the test system 103 determines a penetration test 160 to be performed on a target microsegment 109 in the network 100. In an embodiment, the network 100 is implemented as a zero trust network.

At block 303, method 300 may comprise identifying, by a test application 126 in a test system 103 of the network 100, a plurality of PEPs 109 across a plurality of different microsegments 109 in the network 100. This step may serve to determine potential access points in the enterprise network 100, which may be used by an unauthorized user to access resources within microsegments 109 in the enterprise network 100. At block 306, method 300 may comprise determining, by the test application 126, a penetration test 160 to be performed from a source microsegment 109 to a target microsegment 109. In an embodiment, the target microsegment 109 comprises a first PEP 120 and a second PEP 120.

At block 309, method 300 may comprise recording, by the test application 126, in a database 106 coupled to the test system 106, a test log 144 indicating the source microsegment 109, the target microsegment 109, a path in the network 100 by which to perform the penetration test 160 to access a server in the target microsegment 109, and a unique token 155 identifying the penetration test 160. In an embodiment, the path passes through at least the first PEP 120 and a second PEP 120 before reaching the server. The server may be implemented as an execution platform 115 or microservice 117.

At block 312, method 300 may comprise transmitting, by the test application 126, a test packet 150 through the first PEP 120 to the second PEP 120 along the path in the first microsegment 109. In an embodiment, the test packet 150 comprises the unique token 155 and indicates that a source of the test packet is in a source microsegment 109. In an embodiment, a result log 147 stores data regarding at least one of a reception of the test packet 150 by a policy enforcement point 120 or a subsequent processing step performed on the test packet 150 by the policy enforcement point 120. In an embodiment, the data is stored in the record log 147 in association with the unique token 155.

At block 315, method 300 may comprise transmitting, by a result application 132 in the test system 103, to a PDP 112 in the network 100, a message 170 comprising a recommendation to prohibit a communication from the source microsegment 109 to the target microsegment 109. The message 170 may also include parameters describing the penetration 160 and/or the test packet 150. In an embodiment, block 315 may be performed when or in response to the test packet 150 having impermissibly passed through the second PEP 120 or been processed by the second PEP 120.

Method 300 may comprise other steps and/or other attributes not shown in FIG. 3. In an embodiment, the subsequent forwarding step comprises forwarding the test packet 150 to the server. In an embodiment, method 300 may further comprise obtaining, by a log application 129 in the test system 103, the result log 147 from the second PEP 120. In an embodiment, the unique token 155 is a value identifying the penetration test 160, in which different unique tokens 155 identify different penetration tests 160 having different parameters. In an embodiment, the test packet 150 is encoded according to a data transmission protocol, in which the unique token 155 is carried in a field of the test packet 150. In an embodiment, the result log 147 comprises the unique token 155 and an indication that the test packet 150 of the penetration test 160 impermissibly passed through the second PEP 120, resulting in a failure of the penetration test 160. In an embodiment, the test log 144 comprises the parameters of the penetration test 160 in association with the unique token 155 identifying the penetration test 160.

Figure 4:
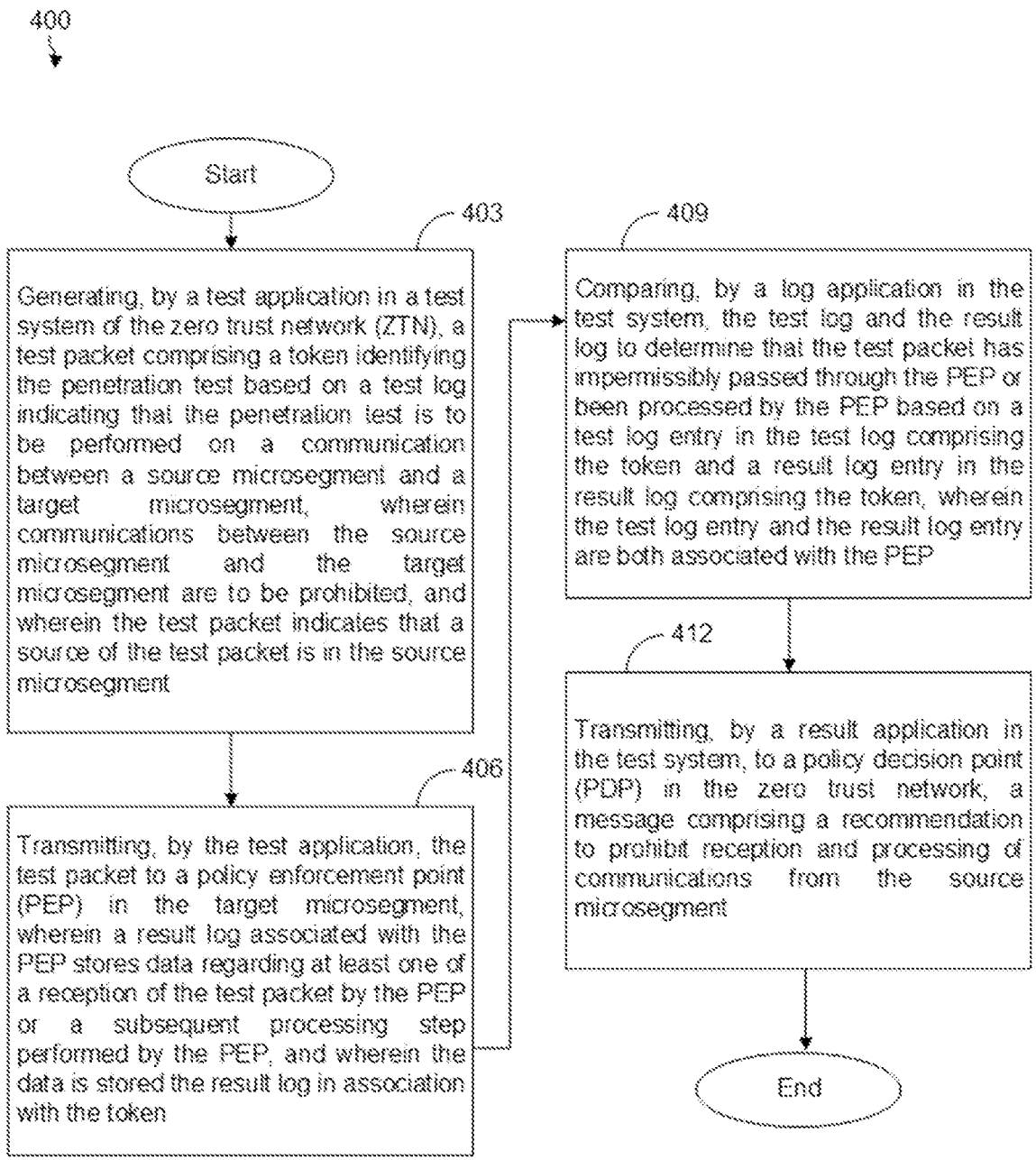
FIG. 4 is a flowchart of a second method according to an embodiment of the disclosure.

Turning now to FIG. 4, a method 400 is described. Method 400 may be implemented by the test system 103 in the network 100. In an embodiment, method 400 may be implemented when a user of the test system 103 determines a penetration test 160 to be performed on a target microsegment 109 in the network 100. In an embodiment, the network 100 is implemented as a zero trust network.

At block 403, method 400 may comprise generating, by a test application 126 in a test system 103 of the network 100, a test packet 150 comprising a unique token 155 identifying the penetration test 160 based on a test log 144 indicating that the penetration test 160 is to be performed on a communication between a source microsegment 109 and a target microsegment 109. In an embodiment, the penetration test 160 may be based on a possible rule 123 that communications between the source microsegment 109 and the target microsegment 109 are to be prohibited. For example, the communications between the source microsegment 109 and the target microsegment 109 may be prohibited based on security specifications that are pre-configured in the network 100, the communications may be prohibited based on rules 123 that have been programmed at the PDP 112, and/or the communications may be prohibited based on the PDP 112 being expected or programmed to prohibit the communications between the source microsegment 109 and the target microsegment 109. For example, when the PEP 120 of the source microsegment 109 requests establishment of a secure tunnel with the PEP 120 of the target microsegment 109, the PDP 112 should ideally respond indicating that the secure tunnel between the source microsegment 109 and the target microsegment 109 is not permitted to be established based on, for example, a pre-configuration at the PDP 112 or a rule 123 at the PDP 112. The PEPs 120 of the source microsegment 109 and the target microsegment 109 should not establish the secure tunnel based on the response received from the PDP 112, thereby preventing communications between the source microsegment 109 and the target microsegment 109. In an embodiment, the test packet 150 indicates that a source of the test packet 150 is in the source microsegment 109.

At block 406, method 400 may comprise transmitting, by the test application 126, the test packet 150 to a PEP 120 in the target microsegment 109. In an embodiment, a result log 147 associated with the PEP 120 stores data regarding at least one of a reception of the test packet 150 by the PEP 120 or a subsequent processing step performed by the PEP 120. In an embodiment, the data is stored in the result log 147 association with the unique token 155.

At block 409, method 400 may comprise comparing, by a log application 129 in the test system 103, the test log 144 and the result log 147 to determine that the test packet 150 has impermissibly passed through the PEP 120 or been processed by the PEP 120. This comparison may be performed on a test log entry in the test log 144 comprising the unique token 155 and a result log entry in the result log 147 comprising the unique token 155. The test log entry and the result log entry may both be associated with the PEP 120. The result log entries that comprise the unique token 155 and identify the PEP 120 may indicate actions performed by the PEP 120 during performing of the penetration test 160.

At block 412, method 400 may comprise transmitting, by a result application 132 in the test system 103, to a PDP 112 in the network 100, a message 170 comprising a recommendation for the PEP 120 in the target microsegment 109 to prohibit receiving and processing communications from the source microsegment 109. The message 170 may comprise parameters describing the penetration test 160 and/or the test packet 150.

Method 400 may comprise other steps and/or other attributes not shown in FIG. 4. In an embodiment, method 400 may further comprise receiving, by the log application 132, the result log 147 from the PEP 120 in response to an authorized request for the result log 147. In an embodiment, the unique token 155 is a value identifying the penetration test 160, in which different unique tokens 155 identify different instances of penetration tests 160 having different parameters. In an embodiment, the test packet 150 is encoded according to a data transmission protocol, in which the unique token 155 is carried in a field of the test packet 150. In an embodiment, the test log 144 comprises the parameters of the penetration test 160 in association with the unique token 155 identifying the penetration test 160. In an embodiment, the result log 147 comprises the unique token 155 and an indication that the test packet 150 of the penetration test 160 impermissibly passed through the PEP 120, resulting in a failure of the penetration test 160.

Figure 5A:
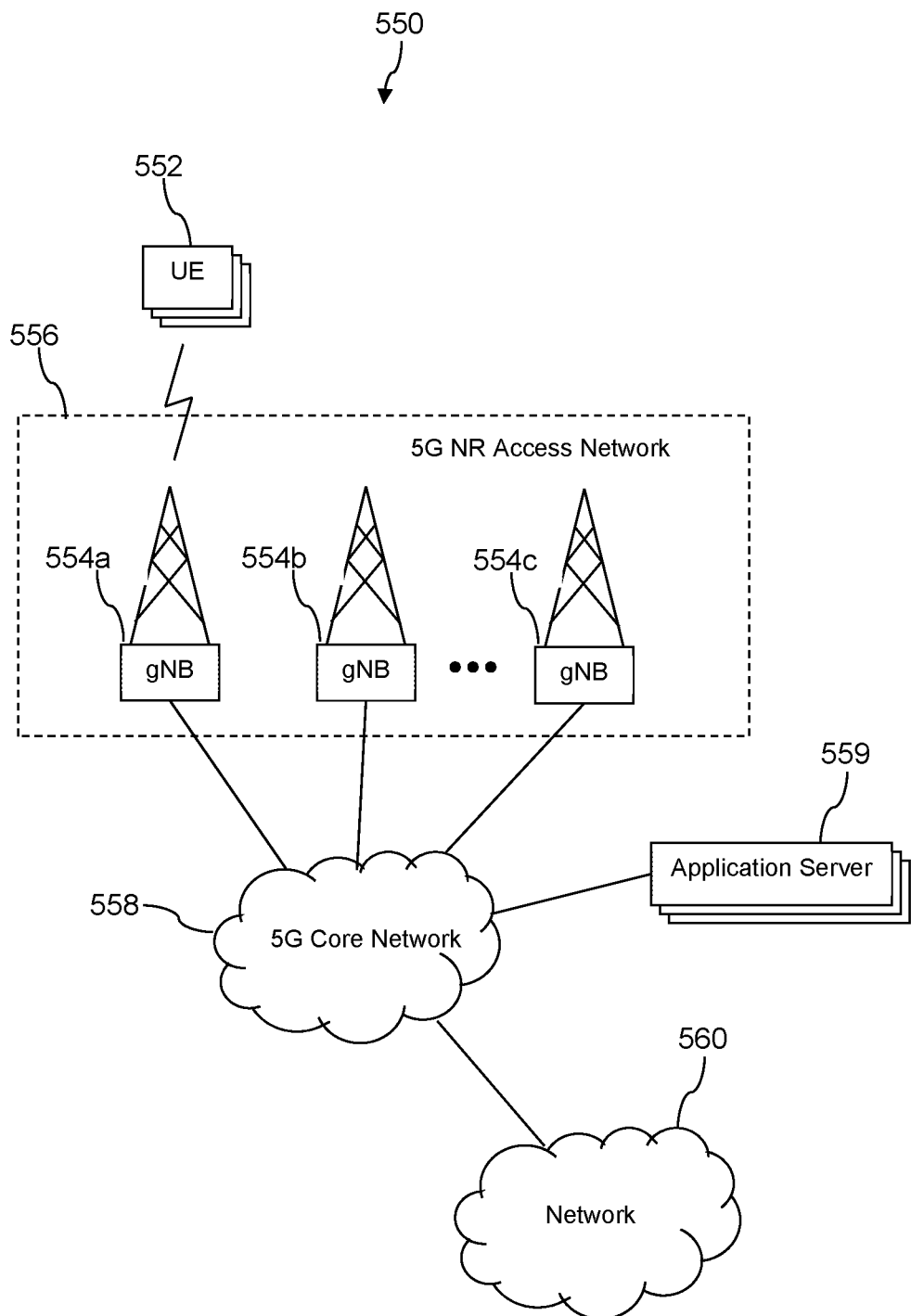
FIGS. 5A-B are block diagrams illustrating a communication system similar to the communication system of FIG. 1 according to an embodiment of the disclosure.

Turning now to FIG. 5A, an exemplary communication system 550 is described. In an embodiment, the communication system 550 may be implemented in the network 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated), or devices such as the test system 103, PEPs 109, and PDP 112, can operate. The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
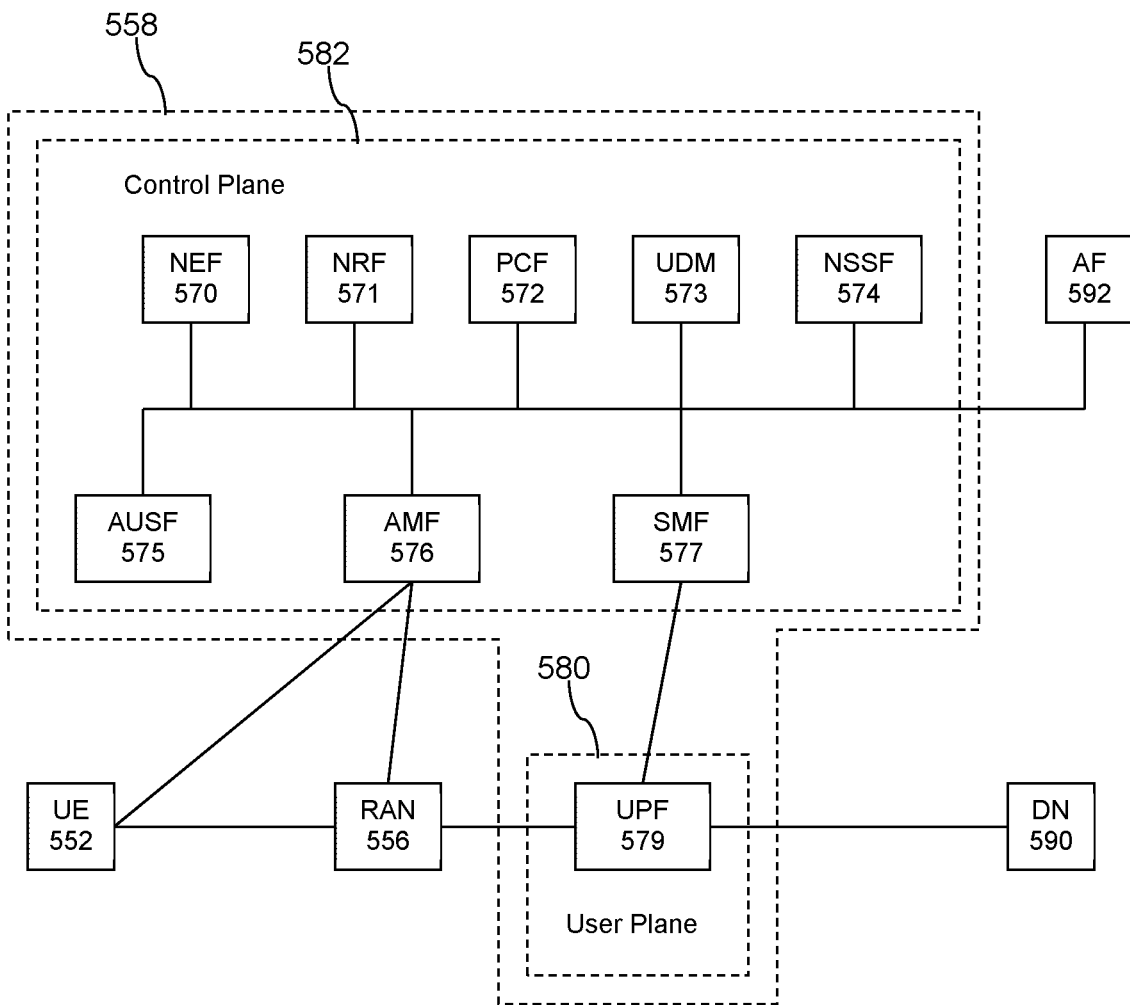

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
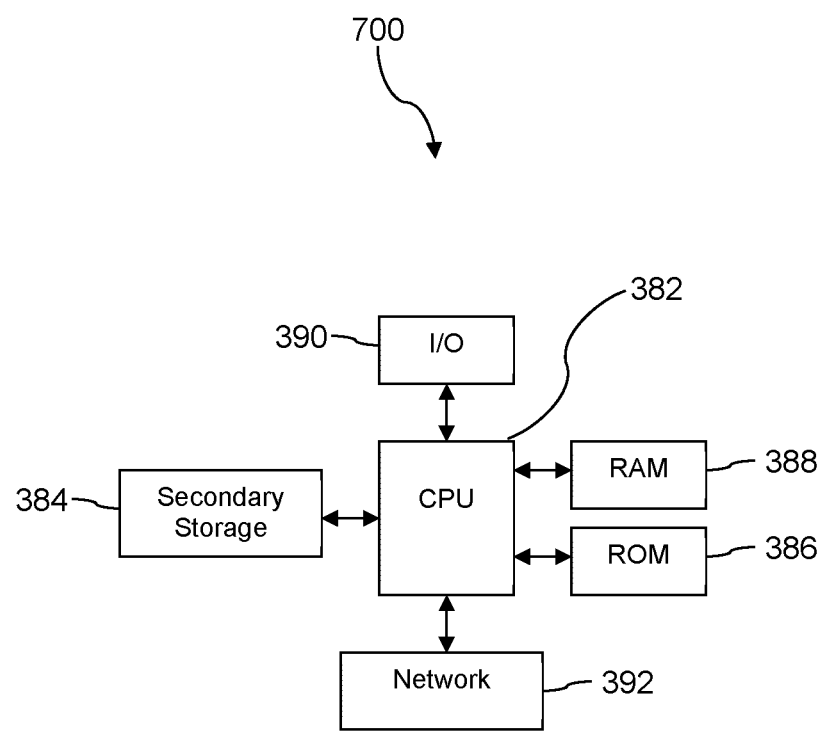
FIG. 6 is a block diagram of a computer system implemented within the communication system of FIG. 1 according to an embodiment of the disclosure.

FIG. 6 illustrates a computer system 700 suitable for implementing one or more embodiments disclosed herein. In an embodiment, the test system 103, PEPs 109, and/or PDP 112 may be implemented as a computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for performing a penetration test in a zero trust network to identify vulnerabilities in the zero trust network, wherein the method comprises:

obtaining, by a test application in a test system of the zero trust network, parameters for performing the penetration test in the zero trust network, wherein the parameters indicate a path from a source microsegment to a target microsegment in the zero trust network, wherein the communications between the source microsegment and the target microsegment are to be prohibited, and wherein the parameters are stored in a test log;

inserting, by the test application, a unique token identifying the penetration test into a test packet to perform the penetration test between the source microsegment and the target microsegment, wherein the test packet indicates that a source of the test packet is in the source microsegment;

transmitting, by the test application, the test packet to a policy enforcement point in the target microsegment, wherein a result log associated with the policy enforcement point stores data regarding at least one of a reception of the test packet by the policy enforcement point or a subsequent processing step performed by the policy enforcement point, and wherein the data is stored in record log in association with the unique token;

determining, by a log application in the test system, whether the test packet impermissibly passed through the policy enforcement point or has been impermissibly processed by the policy enforcement point based on the test log and the result log indicating whether the test packet comprising the unique token has impermissibly passed through the policy enforcement point or been processed by the policy enforcement point; and transmitting, by a result application in the test system, to a policy decision point in the zero trust network, a message comprising a recommendation to prohibit communications from the source microsegment to the target microsegment when the test packet comprising the unique token has impermissibly passed through the policy enforcement point or been processed by the policy enforcement point.

2. The method of claim 1, further comprising receiving, by the log application, the result log from the policy enforcement point, wherein the log application is authorized to receive the result log from policy enforcement points in the zero trust network.

3. The method of claim 1, wherein the unique token is a value identifying the penetration test, and wherein different unique tokens identify different penetration tests having different parameters.

4. The method of claim 1, wherein the test packet is encoded according to a data transmission protocol, and wherein the unique token is carried in a field of the test packet.

5. The method of claim 1, wherein the test log comprises the parameters of the penetration test in association with the unique token identifying the penetration test.

6. The method of claim 1, wherein the result log comprises the unique token and an indication that the test packet of the penetration test impermissibly passed through the policy enforcement point, resulting in a failure of the penetration test.

7. The method of claim 1, wherein the result log comprises a second unique token identifying a second penetration test and an indication that the second penetration test was blocked at the policy enforcement point, resulting in a success of the penetration test.

8. A method for performing a penetration test in a zero trust network to identify vulnerabilities in the zero trust network, wherein the method comprises:
  identifying, by a test application in a test system of the zero trust network, a plurality of policy enforcement points across a plurality of different microsegments in the zero trust network;
  determining, by the test application, a penetration test to be performed from a source microsegment to a target microsegment, wherein the target microsegment comprises a first policy enforcement point and a second policy enforcement point of the plurality of policy enforcement points;
  recording, by the test application, in a database coupled to the test system, a test log indicating the source microsegment, the target microsegment, a path in the zero trust network by which to perform the penetration test to access a server in the target microsegment, and a unique token identifying the penetration test, wherein the path passes through at least the first policy enforcement point and a second policy enforcement point before reaching the server;
  transmitting, by the test application, a test packet through the first policy enforcement point to the second policy enforcement point along the path in the target microsegment, wherein the test packet comprises the unique token and indicates that a source of the test is in a source microsegment, wherein a result log associated with the second policy enforcement point stores data regarding at least one of a reception of the test packet by the second policy enforcement point or a subsequent processing step performed on the test packet by the second policy enforcement point, and wherein the data is stored in the record log in association with the unique token;
  determining, by a log application in the test system, whether the test packet impermissibly passed through the second policy enforcement point or has been impermissibly processed by the second policy enforcement point based on the test log and the result log; and
  in response to determining that the test packet impermissibly passed through the second policy enforcement point or has been impermissibly processed by the second policy enforcement point, transmitting, by a result application in the test system, to a policy decision point in the zero trust network, a message comprising a recommendation to prohibit communications from the source microsegment to the target microsegment.

9. The method of claim 8, wherein the subsequent processing step comprises forwarding the test packet to the server.

10. The method of claim 8, further comprising obtaining, by a log application in the test system, the result log from the second policy enforcement point.

11. The method of claim 8, wherein the unique token is a value identifying the penetration test, and wherein different unique tokens identify different penetration tests having different parameters.

12. The method of claim 8, wherein the test packet is encoded according to a data transmission protocol, and wherein the unique token is carried in a field of the test packet.

13. The method of claim 8, wherein the result log comprises the unique token and an indication of that the test packet of the penetration test impermissibly passed through the second policy enforcement point, resulting in a failure of the penetration test.

14. The method of claim 8, wherein the test log comprises parameters of the penetration test in association with the unique token identifying the penetration test.

15. A method for performing a penetration test in a zero trust network to identify vulnerabilities in the zero trust network, wherein the method comprises:
  generating, by a test application in a test system of the zero trust network, a test packet comprising a unique token identifying the penetration test based on a test log, wherein the test log indicates that the penetration test is to be performed on a communication between a source microsegment and a target microsegment, wherein communications between the source microsegment and the target microsegment are to be prohibited, and wherein the test packet indicates that a source of the test packet is in the source microsegment;
  transmitting, by the test application, the test packet to a policy enforcement point in the target microsegment, wherein a result log associated with the policy enforcement point stores data regarding at least one of a reception of the test packet by the policy enforcement point or a subsequent processing step performed by the policy enforcement point, and wherein the data is stored in the result log in association with the unique token;
  comparing, by a log application in the test system, the test log and the result log to determine that the test packet has impermissibly passed through the policy enforcement point or been processed by the policy enforcement point based on a test log entry in the test log comprising the unique token and a result log entry in the result log comprising the unique token, wherein the test log entry and the result log entry are both associated with the policy enforcement point; and transmitting, by a result application in the test system, to a policy decision point in the zero trust network, a message comprising a recommendation to prohibit reception and processing of communications from the source microsegment.

16. The method of claim 15, further comprising receiving, by the log application, the result log from the policy enforcement point in response to an authorized request for the result log.

17. The method of claim 15, wherein the unique token is a value identifying the penetration test, and wherein different unique tokens identify different penetration tests having different parameters.

18. The method of claim 15, wherein the test packet is encoded according to a data transmission protocol, and wherein the unique token is carried in a field of the test packet.

19. The method of claim 15, wherein the test log comprises parameters of the penetration test in association with the unique token identifying the penetration test.

20. The method of claim 15, wherein the result log comprises the unique token and an indication that the test packet of the penetration test impermissibly passed through the policy enforcement point, resulting in a failure of the penetration test.

* * * * *